United States Patent
Chen

(10) Patent No.: US 6,522,036 B1
(45) Date of Patent: Feb. 18, 2003

(54) MOTOR WITH A HEAT DISSIPATING ASSEMBLY

(76) Inventor: Li-Ming Chen, No. 3, Lane 544, Wen-Hua Rd., Chia-I City (TW)

(*) Notice: Subject to any disclaimer, the term of this patent is extended or adjusted under 35 U.S.C. 154(b) by 0 days.

(21) Appl. No.: 10/055,229

(22) Filed: Jan. 21, 2002

(51) Int. Cl.$^7$ ............................................. H02K 21/22
(52) U.S. Cl. ............................. 310/58; 310/59; 310/89
(58) Field of Search .............................. 310/58, 59, 61, 310/89

(56) References Cited

U.S. PATENT DOCUMENTS

| | | | | |
|---|---|---|---|---|
| 4,908,538 A | * | 3/1990 | Geberth, Jr. ................ | 310/59 |
| 5,489,810 A | * | 2/1996 | Ferreira et al. ............. | 310/54 |
| 5,519,269 A | * | 5/1996 | Lindberg .................... | 310/58 |
| 5,563,461 A | * | 10/1996 | Daniels ...................... | 310/71 |
| 5,747,900 A | * | 5/1998 | Nakamura et al. .......... | 310/58 |
| 5,998,896 A | * | 12/1999 | Early et al. ................. | 310/89 |
| 6,211,587 B1 | * | 4/2001 | Enomoto et al. ............ | 310/52 |
| 6,472,782 B1 | * | 10/2002 | Selci ........................... | 310/63 |

* cited by examiner

*Primary Examiner*—Nestor Ramirez
*Assistant Examiner*—Leda Pham
(74) *Attorney, Agent, or Firm*—Dellett and Walters

(57) ABSTRACT

A motor with a heat dissipating assembly includes a hollow block, a stator fixedly mounted in the block and a rotor rotatably mounted in the stator. A first gap is formed between the block and the stator. A second gap is formed between the stator and the rotor. Multiple through holes are longitudinally defined in the rotor. A stator separator is mounted under the rotor. A groove is defined in the stator separator and communicates with a casing. An air current formed by the rotating rotor flows into the casing through the stator, rotor and the stator separator to form a closed circuit in the motor for dissipating heat. A casing is mounted around the motor and a cooling fan is mounted on the top of the casing to generate an air current to dissipate heat from the outer periphery of the motor.

10 Claims, 4 Drawing Sheets

MOTOR WITH A HEAT DISSIPATING ASSEMBLY

BACKGROUND OF THE INVENTION

1. Field of the Invention

The present invention relates to a motor, and more particularly to a motor with a heat dissipating assembly, which dissipates heat not only from the periphery of the motor but also from elements mounted in the motor.

2. Description of Related Art

A conventional motor in accordance with the prior art generally includes a stator and a rotor respectively in a casing. An operating motor always generates heat so that a cooling fan is mounted on the casing of the motor, and the casing has multiple fins extending outwardly from the outer periphery of the casing of the motor. The cooling fan generates an air current that blows over the fins to dissipate the heat generated by the operating motor.

However, the conventional heat dissipating device only dissipates the heat on the outer periphery of the casing. As is well known, the heat of an operating motor is generated by a stator and a rotating rotor that are mounted in the casing of the motor. Consequently, the conventional heat dissipating device does not completely dissipate the heat of the operating motor. The motor needs to be advantageously altered.

The present invention has arisen to mitigate and/or obviate the disadvantages of the conventional motor dissipating device.

SUMMARY OF THE INVENTION

The main objective of the present invention is to provide an improved motor that has a heat dissipating assembly to dissipate heat from the outer periphery of the motor and elements mounted in the motor.

To achieve the objective, the motor with a heat dissipating assembly in accordance with the present invention comprises a hollow block, a stator fixedly mounted in the block and a rotor rotatably mounted in the stator with all the elements mounted in a casing. A first gap is formed between the block and the stator. A second gap is formed between the stator and the rotor. Multiple through holes are longitudinally defined in the rotor. A stator separator is mounted under the rotor. A groove is defined in the stator separator and communicates with the casing. An air current generated by the rotating rotor flows into the casing via the stator, the rotor and the stator separator to form a closed path in the motor to dissipate heat. The casing is mounted around the motor, and a cooling fan is mounted on the top of the casing to generate an air current to dissipate heat on the outer periphery of the motor.

Further benefits and advantages of the present invention will become apparent after a careful reading of the detailed description with appropriate reference to the accompanying drawings.

DETAILED DESCRIPTION OF THE INVENTION

Figure 1:
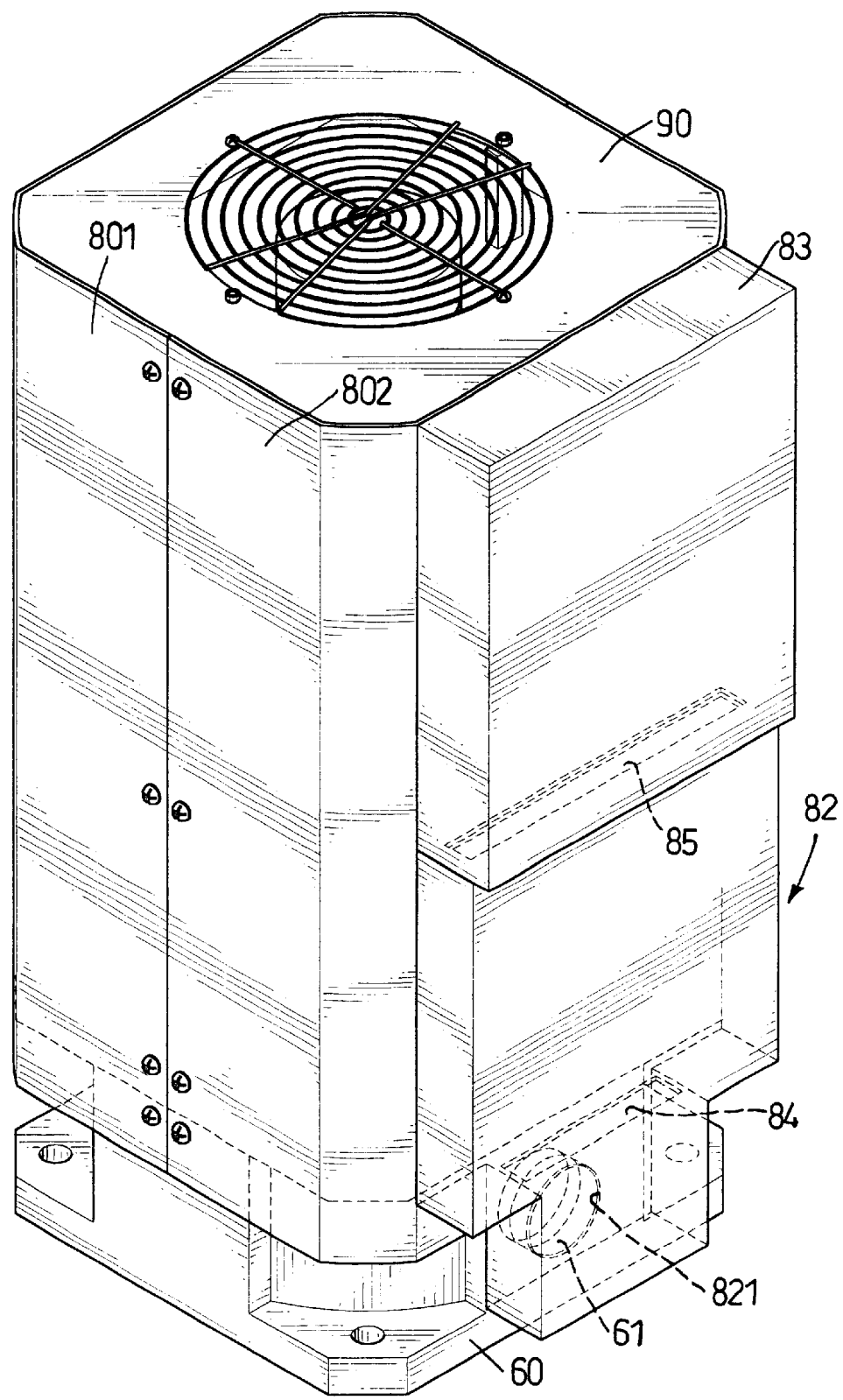
FIG. 1 is a perspective view of a motor with a heat dissipating assembly in accordance with present invention.
Figure 2:
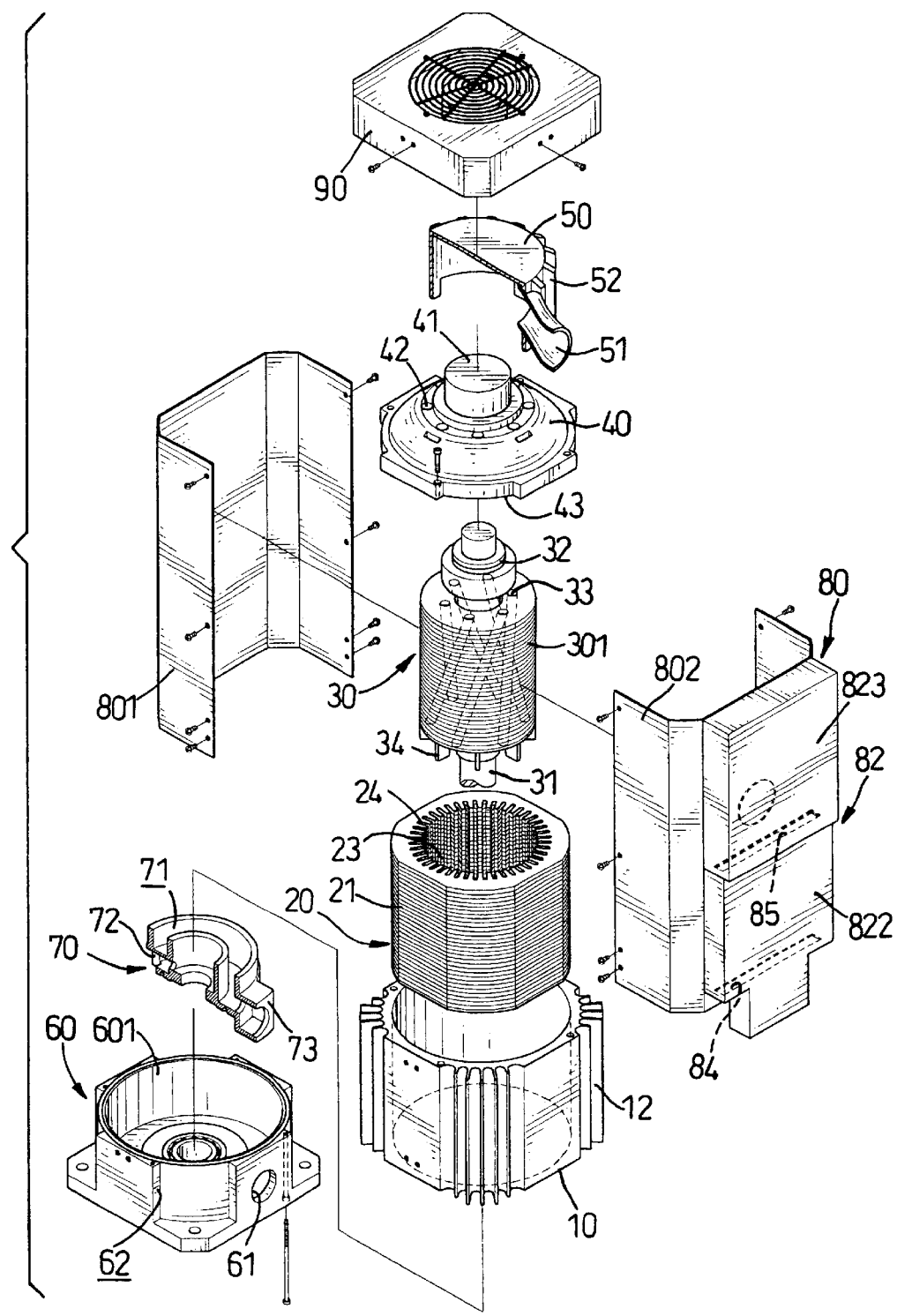
FIG. 2 is an exploded perspective view of the motor with a heat dissipating assembly in FIG. 1.

With reference to the drawings and initially to FIGS. 1 and 2, a motor with a heat dissipating assembly in accordance with the present invention comprises a hollow block (10), stator (20), a rotor (30), a block end cap (40), a base member (60), a stator separator (70), a casing (80), a cover (50) and a cooling fan (90). The hollow block (10) has an open upper end and an open lower end. The stator (20) is mounted in the hollow block (10). The rotor (30) is rotatably mounted in the stator (20). The block end cap (40) is attached to the open upper end of the hollow block (10). The base member (60) is attached to the open lower end of the hollow block (10). The stator separator (70) is mounted between the stator (20) and the base member (60). The casing (80) is mounted around the motor and has an open top. The cover (50) is attached to the block end cap (40). The cooling fan (90) mounted on the open top of the casing (80).

Figure 4:
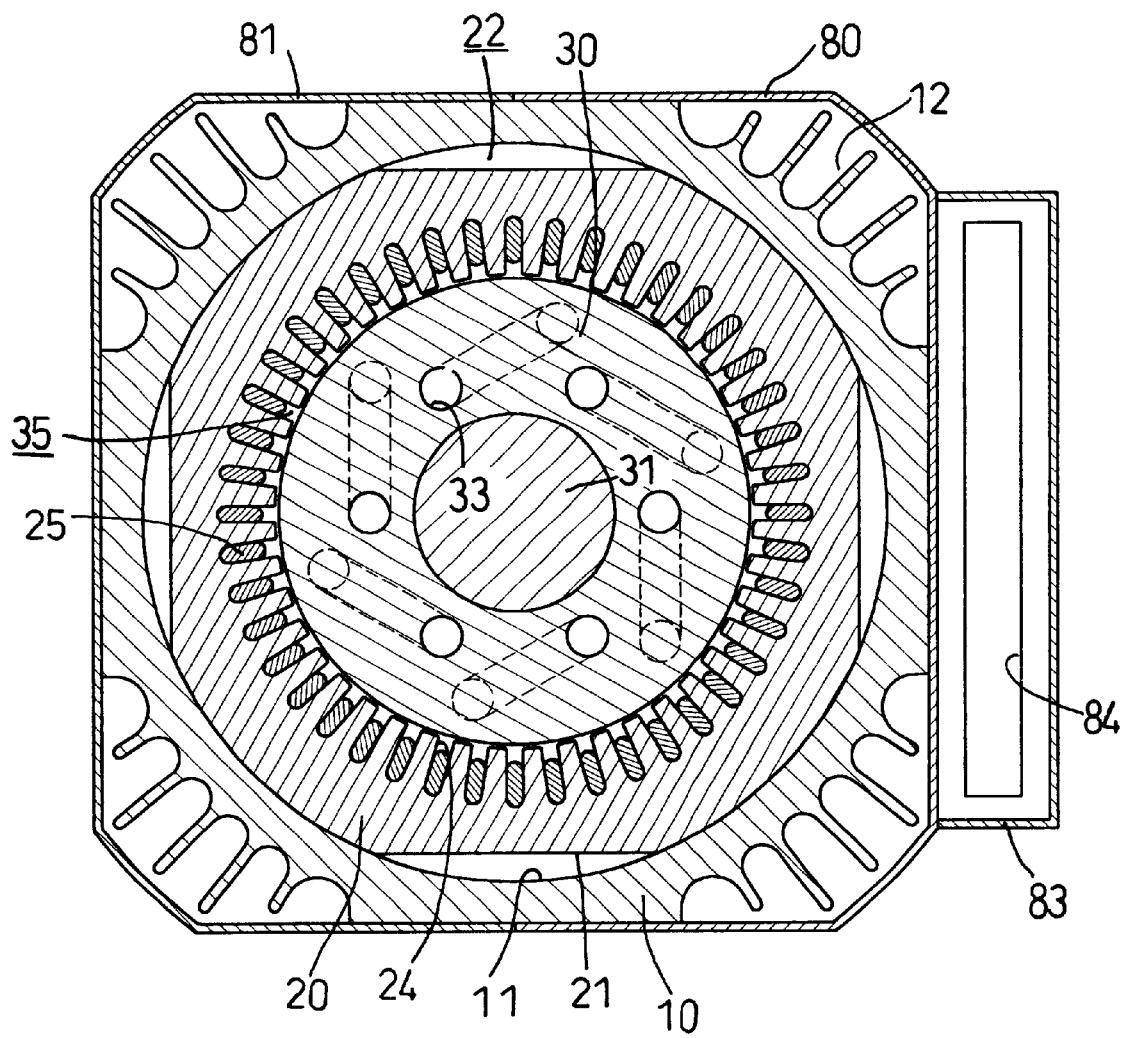
FIG. 4 is a a top cross sectional view of the motor with a heat dissipating assembly along line 4—4 in FIG. 3.

With reference to FIGS. 2 and 4, the hollow block (10) is essentially square and comprises an internal opening (11) longitudinally and centrally defined through the hollow block (11). Each corner of the hollow block (10) has multiple fins (12) extending radially outward from an outer periphery of the hollow block (10).

The stator (20) is mounted in the opening (11) in the hollow block (10) and includes multiple flat, longitudinal surfaces (21) defined on and equally spaced around an outer periphery of the stator (20). The flat, longitudinal surfaces (21) cause multiple first gaps (22) to be formed between the stator (20) and an inner periphery of the opening (11) in the hollow block (10). A through hole (23) is centrally defined in the stator (20), and a series of radial slots (24) are longitudinally defined in a periphery of the through hole (23). Each slot (24) in the periphery of the through hole (23) receives a coil (25).

The rotor (30) comprises a body (301) and a shaft (31) co-axially extending through the body (301). The shaft (31) has a first end and a second end. The first end extends through the base member (60), and a counter (32) is mounted around the second end of the shaft (31). Multiple Ventilating holes (33) are longitudinally defined in and extend through the body (301) around the shaft (31). A series of blades (34) extend downward from the bottom of the body (301) around the shaft (31). The coils (25) do not completely fill the slots (24) so a second gap (35) is formed between an outer periphery of the rotor body (301) and each coil (25).

The block end cap (40) includes a central through hole (not numbered) defined to allow the second end of the shaft (31) to extend through the block end cap (40). A shaft cap (41) is attached to the block end cap (40) to close the central through hole and receive the counter (32). Multiple bores (42) are defined in the block end cap (40) around the shaft cap (41) and extend through the block end cap (40). Multiple recesses (43) are defined in an edge of the block end cap (40). Each recess (43) aligns with multiple fins (12) on a corresponding one of the corners of the hollow block (10).

The cover (50) is attached to the block end cap (40) to form a space between the cover (50) and the block end cap (40) and communicate with the bore in the block end cap (40). The cover (50) includes an outer periphery with a series of fins (52) extending out from the cover (50) and a tube (51) secured on the cover (50) and extending through the cover (50) so that an air current can flow into the space between the cover (50) and the block end cap (40) via the tube (51).

The base member (60) comprises a cavity (601) defined to correspond to and communicate with the opening (11) in the hollow block and in which the stator separator (70) is mounted. A first path (61) is laterally defined through the base member (60) and communicates with the cavity (601). The first path (61) corresponds to the tube (51) in the cover (50). Multiple indents (62) are defined in an outer periphery of the base member (60). Each indent (62) aligns with a corresponding one of the corners of the hollow block (10) so an air can flow through the fins (12) in the hollow block (10) via the indent (62) in the base member (60).

The stator separator (70) abuts the bottom of the stator (20) to hold the rotor (30) in place with the block end cap (40). The stator separator (70) is circular and has a diameter smaller than that of the cavity (601) in the base member (60) and greater than that of the body (301) of rotor (30). A circular groove (71) is defined in the stator separator (70) and communicates with the through hole (23) in the stator (20). The blades (34) of the rotor (30) are movably mounted in the groove (71) in the stator separator (70). A second path (72) is defined in the outer periphery of the stator separator (70) and communicates with the groove (71). A protrusion (73) extends from the outer periphery of the stator separator (70) to abut the periphery of the cavity (601) in the base member (60) and corresponds to the first path (61) in the base member (60). A passage is defined in the protrusion (73) and extends through the protrusion (73) and the stator separator (70). The passage aligns with first path (61) in the base member (60) so the passage communicates with the first path (61) in the base member (60) and the groove (71) in the stator separator (70).

The casing (80) comprises a first shell (801) and a second shell (802). respectively having a U-shaped cross section and attached to the base member (60) and the hollow block (10). The two shells (801, 802) are connected to each other to form a space for hold the motor. The second shell (802) has a bottom facing the first path (61) in the base member (60) and a lower edge situated above the first path (61) in the base ember (60). A fairing (82) is attached to the second shell (802) and has a through hole (821) laterally defined to communicate with the first path (61) in the base member (60), and the tube (51) in the cover (50) extends into the fairing (82). In the preferred embodiment of the present invention, the fairing (82) is divided into a first chamber (822) and a second chamber (823) communicating with each other. The first chamber (822) is T-shaped and includes an upper portion (not numbered) and a lower portion (not numbered). A first slot (84) is defined between the upper portion and the lower portion to provide a path between the upper portion and the lower portion of the first chamber (822). A through hole (821) is defined in the lower portion of the first chamber (822) and aligns with the first path (61) in the base member (60) so that the first fairing (82) communicates with the cavity (601) in the base member (60). The second chamber (823) is attached to the top of the second shell (802) above and adjacent to the first chamber (822). A second slot (85) is defined between the first chamber (822) and the second chamber (823) to provide a path between the first chamber (822) and the second chamber (823). The tube (51) in the cover (50) extends through the top of the second shell (802) into the second chamber (823).

The cooling fan (90) is mounted on the top of the casing (80) to close the top of the casing (80) and blow air into the casing (80).

Figure 3:
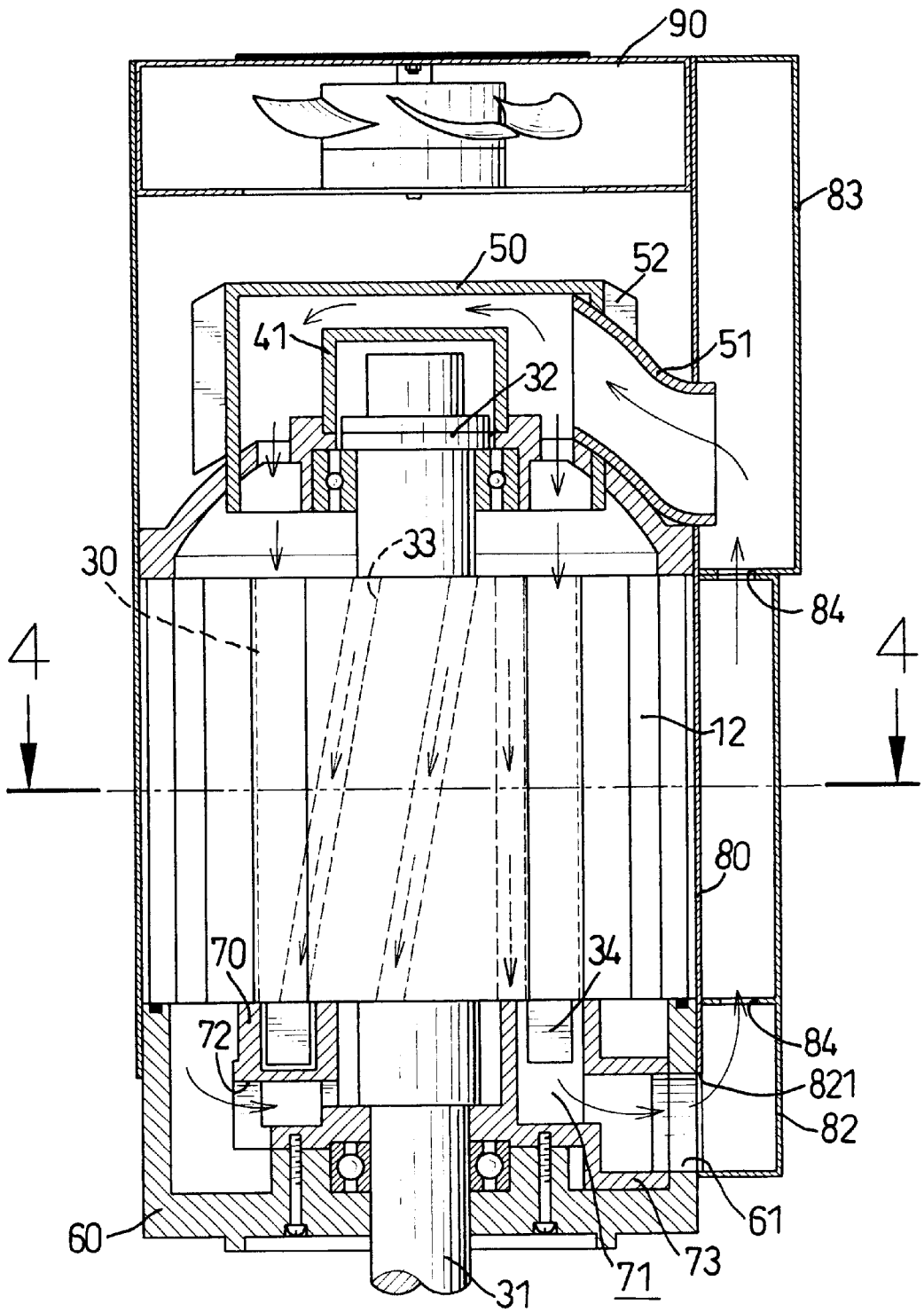
FIG. 3 is a front plan view in partial section of the motor with a heat dissipating assembly in FIG. 1.

With reference to FIGS. 3 and 4, the rotating rotor (30) generates an air current that pushes the hot air in the motor through the first gap (22), the second gap (35) and the ventilating hole (33) in the rotor (30). The hot air passing the second gap (35) and the ventilating holes (33) in the rotor (30) blows into the groove (71) in the stator separator (70). The hot air passing through the first gap (22) is guided in the cavity (601) in the base member (60) and flows into the groove (71) in the stator separator (70) via the second path (72). The blades (34) of the rotor (30) are mounted and move in the groove (71) in the stator separator (70) to make the hot air in the stator separator (70) flow into the first chamber (822) via the passage (731) and the first path (61). The hot air is cooled in the first fairing (82) and the second fairing (83) because the volume of the two fairings (82, 83) is greater than that of the stator separator (70) and the base member (60) so the speed of the hot air reduces in the first fairing (82) and the second fairing (83). The cooled air flows into the motor via the tube (51) extending into the second fairing (83) and the bore (42) in the block end cap (40) to form a cooling circulation for the elements in the motor. The cooling circulation is reversed when the rotor (30) is operated and reversed and the cooling effect is unchanged.

Furthermore, the cooling fan (90) mounted on the top of the casing (80) generates an air current that flows through the recesses (43) in the edge of the block end cap (40) and the fins (12) on the corners of the hollow block (10) to cool the outer periphery of the motor. The hot air flows out through the indents (62) in the base member (60).

As described above, the motor with a heat dissipating assembly that dissipates heat from the elements mounted in the motor and the outer periphery of the motor can completely dissipate the heat generated by the motor and lengthen the useful life of the motor.

Although the invention has been explained in relation to its preferred embodiment, it is to be understood that many other possible modifications and variations can be made without departing from the spirit and scope of the invention as hereinafter claimed.

What is claimed is:

1. A motor with a heat dissipating assembly, comprising:
   a hollow block including an opening longitudinally and centrally defined in the hollow block, and multiple fins extending radially out from an outer periphery of the hollow block;
   a stator mounted in the opening in the hollow block and forming multiple first gaps between a periphery of the opening in the hollow block and an outer periphery of the stator, a through hole centrally and longitudinally defined in the stator and a series of slots defined in a periphery of the through hole in the stator, each slot receiving a coil in the stator;
   a rotor rotatably mounted in the through hole in the stator and a second gap formed between the coil and the rotor, the rotor including a body and a shaft co-axially extending through the body, multiple ventilating holes longitudinally defined in and extending through the body around the shaft, a series of blades extending down from a bottom of the body around the shaft;
   a block end cap attached to the hollow block, the block end cap including multiple bores defined in and extending through the block end cap, multiple recesses defined in an edge of the block end cap and corresponding to the fins of the hollow block;
   a cover attached to the block end cap to form a space between the block end cap and the cover, wherein the bores in the block end cap communicate with the space between the block end cap and the cover, a tube extending through the cover and secured on the cover so that air can flow in the space between the block end cap and the cover;

a base member attached to a bottom of the hollow block, the base member including a cavity defined to correspond to and communicate with the opening in the hollow block, a first path laterally defined in and extending through the base member to communicate with the cavity in the base member;

a stator separator mounted in the cavity in the base member and abutting a bottom of the stator, the stator separator including a groove defined to movably receive the blades of the rotor and a passage laterally defined in and extending through the stator separator to communicate with the groove in the stator separator, the passage aligning with and communicating with the first path in the base member;

a casing attached to the base member and the hollow block, the casing containing a space to mount the motor and having a fairing attached to an outer periphery of the casing, the fairing having a through hole defined to communicate with the first path in the chamber and the tube in the cover extending into the casing; and a cooling fan mounted on a top of the casing to close the casing and blow air into the casing.

2. The motor with a heat dissipating assembly as claimed in claim 1, wherein the hollow block is square and has four corners with multiple fins radially extending from each corner of the hollow block.

3. The motor with a heat dissipating assembly as claimed in claim 1, wherein the stator comprises multiple longitudinally, flat surfaces are defined in and are equally spaced around an outer periphery of the stator so that multiple first gaps are formed between the stator and an inner periphery of the opening in the hollow block.

4. The motor with a heat dissipating assembly as claimed in claim 1, wherein the shaft of the rotor includes a first end extending through the base member and a second end having a counter mounted around the shaft, and the block end cap includes a central through hole defined to allow the second end of the shaft to extend through the block end cap and a shaft cap attached to the block end cap to close the central through hole and receive the counter of the rotor.

5. The motor with a heat dissipating assembly as claimed in claim 1, wherein the stator separator comprises a protrusion extending from an outer periphery of the stator separator to abut an inner periphery of the cavity in the base member and correspond to the first path in the base member, and a passage defined in the protrusion and extending through the protrusion and the stator separator, the passage aligning with the first path in the base member so that the passage communicates with the first path in the base member and the groove in the stator separator.

6. The motor with a heat dissipating assembly as claimed in claim 1, wherein the casing comprises a first shell and a second shell respectively having a U-shaped cross section and attached to the base member and the hollow block and the first shell and the second shell are connected to each other to form the space to mount the motor.

7. The motor with a heat dissipating assembly as claimed in claim 1, wherein the cover includes an outer periphery having a series of fins extending outwardly from the cover.

8. The motor with a heat dissipating assembly as claimed in claim 1, wherein the fairing is divided into a first chamber and a second chamber communicating with each other.

9. The motor with a heat dissipating assembly as claimed in claim 8, wherein the first chamber is T-shaped and includes an upper portion and a lower portion, a first slot is defined between the upper portion and the lower portion to provide a path between the upper and lower portions of the first chamber, a through hole laterally defined in the lower portion of the first chamber and aligning with the first path in the base member so that the first chamber communicates with the cavity in the base member.

10. The motor with a heat dissipating assembly as claim 8, wherein the second chamber is attached to the casing above and adjacent to the first chamber, a second slot is defined between the first chamber and the second chamber to provide a path between the first chamber and the second chamber, the tube of the cover extending through the casing and into the second chamber.

* * * * *